United States Patent Office 2,846,466
Patented Aug. 5, 1958

2,846,466

MANUFACTURE OF BASIC PETROLEUM SULFONATE SALTS USING TWO-STEP NEUTRALIZATION IN NON-AQUEOUS PHASE

Gifford W. Crosby, River Forest, and Le Roi E. Hutchings, Crystal Lake, Ill., assignors to The Pure Oil Company, Chicago, Ill., a corporation of Ohio No Drawing. Application December 29, 1954
Serial No. 478,504

4 Claims. (Cl. 260—504)

This invention relates to a method of preparing basic sulfonates from sulfonatable organic materials wherein the problem of emulsification due to the presence of a water phase is eliminated, and the neutralization reaction to form the basic salt is carried out in two steps under conditions such that pH control and phase separation are no longer necessary.

This invention constitutes an improvement over the prior art methods of producing basic sulfonates as represented by United States Patent 2,395,774 by E. Amott et al., dated February 26, 1946, and United States Patent 2,514,733 by M. J. Vold et al., dated July 11, 1950. The former patent represents the type of operation wherein a hydrocarbon oil is reacted with sulfuric acid to form a reaction mixture comprising sulfonic acids dissolved in unreacted oil. This mixture includes in addition a sludge phase and a sufficient amount of a slurry of an alkaline metal compound is added thereto to adjust the pH of the water phase to within the limits of approximately 9.5 and 5.0. Following this, a settling step is employed to form an upper phase containing sulfonates in oil, and a lower phase containing free water and solids, which phases are then separated to obtain the final products. Amott et al. state that in a specific example, about 100 grams of lubricating oil were treated with 34 grams of fuming sulfuric acid (containing 30% $SO_3$ by wt.) at 80°–120° F. for 15 minutes. Various samples of the mixture were then added to portions of a slurry of lime or calcium carbonate, i. e., 366 to 500 millimols per 200 ml. of water, and following this, naphtha was added and the mixtures allowed to settle. Various settling times were noted. With this procedure the importance of the pH of the water phase becomes apparent.

Vold et al., on the other hand, describe a process wherein a concentrate of metal sulfonates in lubricating oil is prepared by treating a solvent-refined lubricating oil having a VGC of between about .80 to .92 with a sulfonating agent including sulfuric acid and sulfur trioxide, adding a volatile hydrocarbon diluent to separate sludge, neutralizing the acid oil produced with a metal base, and separating a sulfonate concentrate. Vold's neutralization may be carried out in two steps with, however, the limitation that an aqueous solution of a neutral salt be used in the first step. Also, some of the water-soluble sulfonate salts are lost in the water phase. Furthermore, the excess carbonate needed for Vold's reaction necessitates the separation of a carbonate sludge. In the prior art processes additional water is introduced upon neutralization when sulfuric acid is the sulfonating agent, and relatively large amounts of water are introduced by the use of a carbonate slurry to accomplish neutralization.

We have found that the introduction of a carbonate as a slurry complicates the process by introducing excess water. Further, in a number of experiments we have found that the presence of a solid phase, i. e., metal carbonate, not only is detrimental to the easy clarification of the final, neutralized sulfonates, but that a superior basic alkaline-earth metal petroleum sulfonate is produced when purified bases essentially free of carbonates and sulfates are used during the neutralization. Metal hydroxides may contain from 3.0 to 12.0 percent by weight of carbonate or other impurities, and if these materials are removed, they constitute an economic loss in the process. It has further been found that although alkaline-earth metal carbonates, especially barium carbonate, do not react with petroleum sulfonic acids to an extent necessary to form basic salts thereof in the absence of water, there is a minimum amount of water, namely about 1 to 5% by weight based on original oil charge, which is sufficient to substantially saturate the oil phase and allow the use of alkaline-earth metal carbonate in the first-stage neutralization. Contrary to expectations, it was found possible to complete the reaction with this small amount of water present, and avoid the necessity of separating an aqueous phase, without the necessary step of attaining any particular pH in the water present. Actually, by test, the pH of the very small amount of water which remains in the oil phase is distinctly acid, being about 1.0. Accordingly, the carbonates removed during the purification of a metal oxide or hydroxide become useful as first-stage neutralization agents. Furthermore, it has been found that by conducting the reaction in this manner, the second-stage neutralization is easily carried out without excessive reaction temperatures, and the use of an aqueous medium during the second stage is unnecessary.

Accordingly, the primary object of this invention is to provide a process for the preparation of basic petroleum sulfonate salts using a two-step neutralization wherein there is a substantial absence of an aqueous phase.

A further object of this invention is to provide a method of preparing basic petroleum sulfonate salts using a two-step neutralization wherein a metal carbonate is used in the first step and a metal base is used in the second step.

Another object of this invention is to carry out the neutralization of petroleum sulfonic acids for the preparation of the basic salts thereof by using a two-stage neutralization and having present a minimum quantity of water, whereby no aqueous phase appears, wherein during the first stage neutralization the acid number of the partially neutralized sulfonic acid is reduced to about 10, and the second stage neutralization is used to bring the salt to the desired basicity. Still another object of this invention is to provide a method for the preparation of basic petroleum sulfonic acid salts using a two-stage neutralization employing a metal carbonate in the first stage and a metal base in the second stage, during which first stage a certain minimum amount of water, namely 1–5% by wt., or sufficient to substantially saturate the sulfonic acids mixture, is maintained.

These and other objects of the invention will be in part described or will be obvious from the remaining description of the present invention.

Mixtures of mahogany sulfonic acids and green sulfonic acids may be prepared from mineral lubricating oils by contact with concentrated sulfuric acid or oleum. If sulfuric acid or oleum is used as the sulfonating agent, introduction of an aqueous phase into the reaction mixture during neutralization requires special precautions during the separation of salts. Sulfur trioxide may be used as a sulfonating agent either in a liquid carrying-medium or in a gaseous phase. In the gas-phase operation, the green acids separate out as a sludge and it is not necessary to strip sulfur dioxide from the reaction mixture. The present invention applies more directly to those methods of preparing sulfonic acids wherein a minimum amount of sulfur dioxide is employed or introduced during the reaction stage, and therefore relates particularly to methods using a mixture of sulfur trioxide and liquid sulfur dioxide as the sulfonating agent, the latter acting as a solvent or modifier. In two copending applications, the first entitled, Sulfonation of Petroleum Oils, Serial No. 471,527, filed November 26, 1954, by L. E. Hutchings, and the second, Manufacture of Sulfonates, Serial No. 478,450 filed December 29, 1954, now U. S. Patent No. 2,802,026, by H. Hennig, W. Alford and L. Hutchings, are described methods of the application of sulfur trioxide and sulfur dioxide to the preparation of petroleum sulfonates which may be modified to utilize the present invention. In general, the present invention may be described as a process for the preparation of a concentrate containing a metal sulfonate dissolved in a lubricating oil, which sulfonate has been prepared by use of an anhydrous sulfonating agent, by adding thereto a metal carbonate along with only about 1–5% by weight of water, maintaining the reaction mixture at a temperature of about 120° to 180° F. to completely utilize the carbonate, and, following this, treating the reaction mixture with a metal base at a temperature of 300° to 400° F. in sufficient amount to yield the desired oil-soluble basic metal petroleum sulfonate.

The invention is illustrated by a comparison of the following examples:

Example I 100 grams of 200 vis. 85 V. I. finished neutral oil which had been solvent extracted, dewaxed and clay contacted was treated with 8 grams of sulfur trioxide. The oil was thoroughly mixed with 4 volumes of liquid sulfur dioxide at atmospheric pressure prior to the slow addition of the sulfonating agent which consisted of said sulfur trioxide, dissolved in 5 volumes of liquid sulfur dioxide at atmospheric pressure. The sulfonation took place at about 14° F. and the total contact time was about 10 minutes. At the end of the sulfonation, all of the sulfur trioxide had been reacted. Next, about 0.5 volume (oil basis) of toluene was added to the mixture to keep any sulfonic acids from separating out during sulfur dioxide removal, and to fluidize the oil phase so that it could be completely removed from the Dewar vessel in which the sulfonation was conducted. The sulfonation reaction mixture was then poured into a large beaker and the sulfur dioxide was stripped out of the reaction mixture by means of mild heating and stripping with nitrogen. The acid number of the oil at this point was about 44. The sulfur-dioxide-free sulfonic acid mixture was then treated with 80% of the amount of barium carbonate required to neutralize the sulfonic acids. No water was added. Although the mixture was stirred vigorously and heated, the acid number of the product was only reduced to 27, and most of this reduction could be attributed to acid sludge loss and thermal decomposition of the acids, rather than to neutralization.

Example II

A mixture of 100 grams of 200 vis., 85 V. I., neutral oil and 300 cc. of liquid sulfur dioxide at 14° F. is treated with 8 grams of sulfur trioxide dissolved in 20 cc. of liquid sulfur dioxide. The mixture is thoroughly agitated for about 5 minutes. At the end of this time, 100 cc. of toluene is added and the mixture poured into a large vessel. Nitrogen is passed through the mixture while constant stirring is applied. The mixture is heated gently to bring the temperature to about 150° F. When sulfur dioxide is no longer detectable in the vapors rising from the product, which operation ordinarily consumes about two hours, 7.9 grams of barium carbonate are added along with 3 cc. of water. This represents about 3.0 wt. percent of water based on the original oil-charge. The mixture is then heated to maintain the 150° F. temperature, and agitation is applied vigorously for about 10 minutes. Thereafter 6.9 grams of barium hydroxide are added and vigorous agitation applied while the reaction mixture is heated quickly to 350° F. The temperature is held at 350° F. until all the water is driven off, which takes about 30 minutes. The product is then ready for use, being substantially free of all solid matter, and having all of the barium that has been added incorporated therein as part of the finished product. The finished product has a sulfate ash content of 15.7% and a base number of 28.5.

It is apparent from Example I that when no water is present during the neutralization, a reaction does not take place and the acid number of the finished product remains at a value of about 27. In Example II, 3 wt. percent of water is used and a basic product having the desired base number of 28.5 is prepared. This 3 wt. percent of water represents a quantity sufficient to substantially saturate the sulfonic acids phase during the neutralization reaction. More or less than 3% of water may be used depending upon the reaction conditions employed, and particularly upon the type of oil being treated. In the example given, the oil is from a mid-continent crude and the solvent refining produces an oil which is predominantly paraffinic in nature. However, the miscibility of small amounts of water with various types of petroleum sulfonic acids will vary slightly depending upon the previous treatment and source of the oil being processed. In general, this amount of water will vary between about 1 to 5 wt. percent based on original oil-charge in order to insure the substantial saturation of the sulfonic acids phase. If necessary, separate tests may be conducted to ascertain the amount of water needed for this purpose. The presence of a slight excess, that is 1 to 20 wt. percent of water of that required to actually saturate the oil phase is not detrimental.

One embodiment of this invention is the finding that metal salts of weak acids may be completely reacted with sulfonic acids, particularly petroleum sulfonic acids, provided there is a sufficient amount of water present to substantially saturate the sulfonic acid phase of the sulfonated mixture. For this purpose any metal salt of a weak acid may be used, such as the carbonate, acetate, phosphate or borate. Since the reaction or neutralization products of carbonates are gaseous, the metal carbonates are preferred. The use of the metal salts of other weak acids may entail a separation or purification step to free the products of contaminating phosphates, etc., for certain uses. In applying the invention to the preparation of metal sulfonates broadly, the metal carbonate is used in the first step in a sufficient quantity to reduce the acid number of the product to a lower limit of 10, with an upper limit of about 20, i. e., less than a stoichiometric amount necessary for complete neutralization. Pure metal salts of weak acids may be used for this purpose. Also, the metal salt of a weak acid used in the first step may be a different metal than the base used in the completion of the reaction in the second step when preparing mixed sulfonates for special purposes. When the invention is applied to the preparation of metal sulfonates from petroleum sulfonic acids which are widely used in lubricating oil compositions, it is the general practice to employ alkaline-earth metal hydroxides or oxides. These commercial salts will contain from 3 to 6% by weight or more of carbonate impurities which are separated for utilization in the first step neutralization in accordance with the preferred embodiment of the invention. This amount of carbonate is not sufficient to supply all of the metal salt of a weak acid for the first step in preparing metal petroleum sulfonates. Accordingly, the supply of metal carbonate must be augmented by use of commercial alkaline-earth metal carbonates, i. e., barium carbonate, or calcium carbonate, to provide the necessary amount to completely react with the petroleum sulfonic acids and reduce the acid number to a lower limit of 10 in the first step. The amount of carbonate used in the first step will vary depending on whether pure sulfonic acids of acid numbers upwards of 120 to 130, or petroleum sulfonic acids having acids numbers upwards of 52, are being treated. It is contemplated within the scope of the invention as applied to the preparation of metal salts of petroleum sulfonic acids, that a single metal salt of a weak acid, or a mixture of two or more metal salts of weak acids, may be used in the first step of the reaction, and that a single metal base or hydroxide or a mixture of metal bases or hydroxides may be used in the second step. As an illustration, the invention may be directed to the preparation of barium petroleum sulfonates or calcium petroleum sulfonates or their mixtures. The general practice is, however, to direct the reactions toward the preparation of alkaline-earth metal or alkali metal salts of petroleum sulfonic acids containing only one metal constituent.

The oil-soluble metal petroleum sulfonates produced in accordance with the invention show good detergent properties when compounded in lubricating oils and tested by both the bench detergency test and COT engine test. In general, any sulfonatable petroleum hydrocarbon stock may be treated in acordance with the invention, including both naphthenic and paraffinic base oils. The invention is most advantageous with those sulfonatable materials which are not appreciably soluble in sulfur dioxide, that is, non-polar organic compounds exemplified by the 200 vis (100° F.) neutral oil of 85 V. I. used in the examples herein. Other non-polar organic materials would include paraffinic hydrocarbons of lower molecular weight than those found in lubricating oil fractions. Solvent extract fractions produced in the refining of lubricating oils, as bright stocks, may be used where the sulfonation process of the present invention is directed to the preparation of water-soluble sulfonic acids. The only limitations attaching to the invention appear in the appended claims.

What is claimed is:

1. In the process for preparing basic alkaline earth metal salts of petroleum sulfonic acids derived from the treatment of solvent refined, dewaxed and clay treated lubricating oil fractions having viscosities of about 200 SUS at 100° F. and a viscosity index of about 85 with a sulfonating agent comprising sulfur trioxide dissolved in sulfur dioxide under conditions to form a sulfonated petroleum lubricating oil mixture from which excess sulfonating agent has been removed, the improvement comprising reacting said sulfonated petroleum lubricating oil mixture with less than a stoichiometric amount of an alkaline earth metal salt of a weak inorganic acid selected from the group consisting of carbonates, acetates, phosphates, and borates whereby to form an acid salt of said petroleum sulfonic acids having an acid number of between about 10 to 20, said reaction being carried to completion at a temperature of about 150° F. and in the presence about 1.0 to 5.0 weight percent of water based on the weight of said sulfonated petroleum lubricating oil, said amount of water being sufficient to substantially saturate the petroleum sulfonic acid phase of said mixture, reacting said partially-neutralized petroleum sulfonic acids with a sufficient amount of a purified carbonate-free alkaline earth metal base to form the basic metal salt of said partially-neutralized petroleum sulfonic acids, raising the reaction mixture to a temperature of about 300° to 500° F. to evaporate the water therefrom and recovering basic alkaline earth metal petroleum sulfonates from said reaction mixture.

2. The process in accordance with claim 1 in which said alkaline earth metal salt of a weak inorganic acid is barium carbonate obtained as the result of the purification of commercial barium hydroxide which latter is used in purified condition to form the basic petroleum sulfonic acid salt in said second neutralization reaction step.

3. The process in accordance with claim 2 in which the barium carbonate is obtained as the result of the purification of commercial barium oxide which latter is used in the purified condition to form said basic petroleum sulfonic acid salt.

4. The process in accordance with claim 1 in which the alkaline earth metal salt of a weak inorganic acid is calcium carbonate.

References Cited in the file of this patent

UNITED STATES PATENTS

| | | |
|---|---|---|
| 2,149,661 | Brandt | Mar. 7, 1939 |
| 2,402,325 | Griesinger et al. | June 18, 1946 |
| 2,532,997 | Cohen | Dec. 5, 1950 |
| 2,671,797 | Hagemann et al. | Mar. 9, 1954 |
| 2,682,509 | Ross | June 29, 1954 |
| 2,713,034 | Clarke et al. | July 12, 1955 |
| 2,760,970 | LeSuer | Aug. 28, 1956 |